Figure 1:
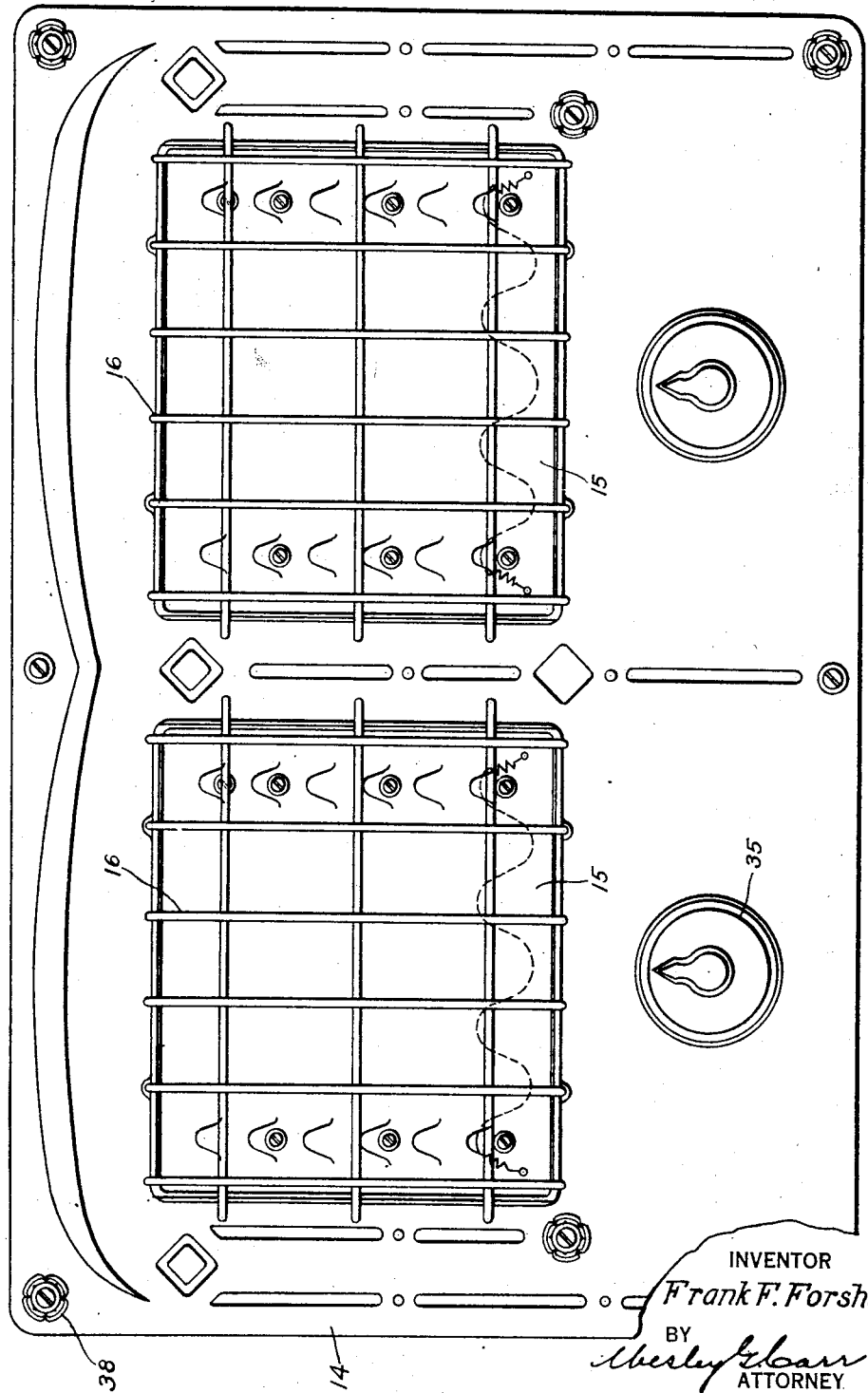

Jan. 1, 1929.  1,697,176

F. F. FORSHEE

ELECTRIC HEATER

Filed July 14, 1927  2 Sheets-Sheet 2

INVENTOR
Frank F Forshee.
BY
ATTORNEY

Patented Jan. 1, 1929.

1,697,176

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

ELECTRIC HEATER.

Application filed July 14, 1927. Serial No. 205,578.

My invention relates to electric heaters and particularly to electric air heaters for wall mounting.

An object of my invention is to provide a relatively simple electric heating unit for a wall heater, that shall be easily and quickly assembled and placed in or removed from its proper operative position in a casing.

Another object of my invention is to provide an electric heating unit that shall embody a refractory resistor-supporting plate and a metal frame therearound.

In practicing my invention, I provide a sheet metal casing, of substantially pan-shape, and having an open front, together with a plurality of spaced pairs of recessed ledges secured to the walls of the case. I provide a quickly removable heating unit embodying a substantially rectangular resistor-supporting plate of refractory material, a resistor thereon, and a metal frame for the edges of the plate embodying interfitting angle bars and channel members. End portions of the angle bars fit into and rest upon the recessed ledges to hold the heating unit in proper operative position in the casing. A control switch is mounted upon a plate secured to the lower angle bar member and depending therefrom.

Figure 2:
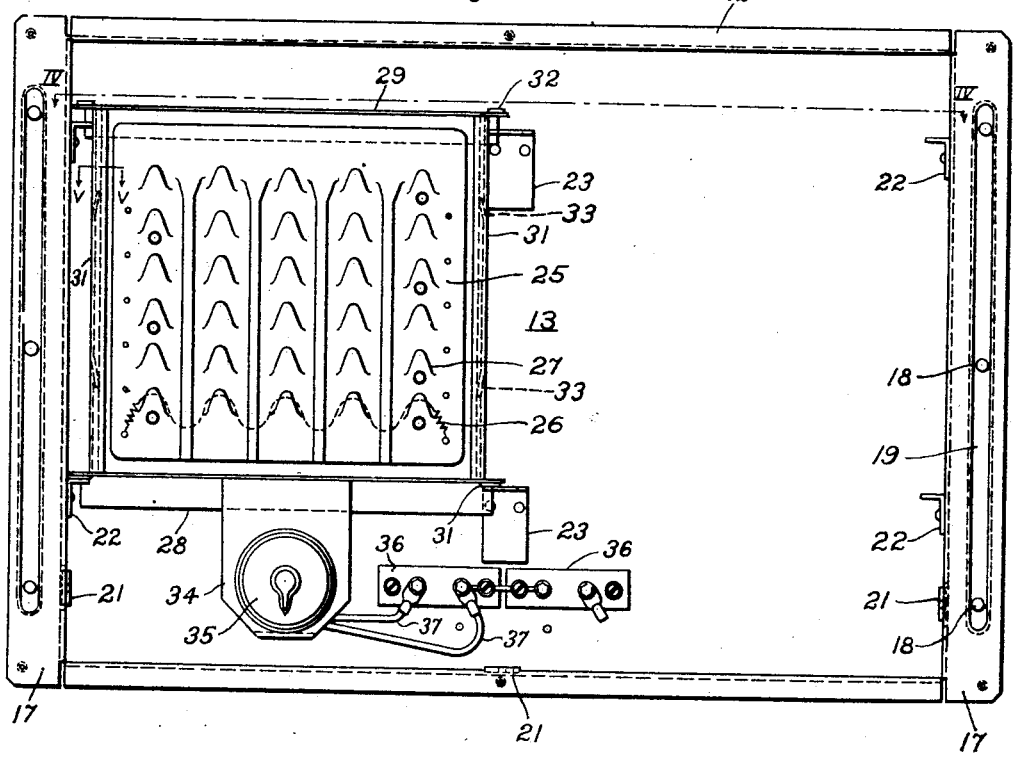
Figure 3:
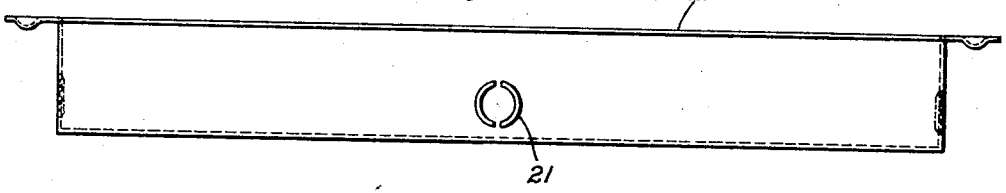
Figure 4:
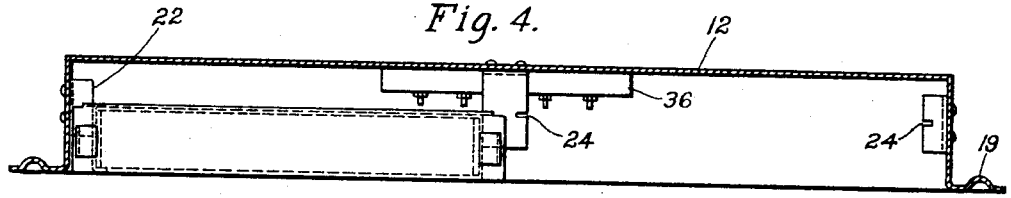
Figure 5:
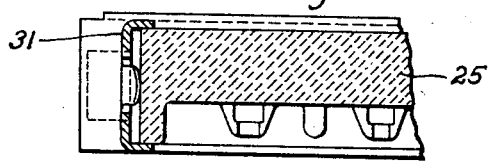

In the drawings:

Figure 1 is a view, in front elevation, of a wall heater embodying my invention, Fig. 2 is a view, in front elevation thereof, with the cover member removed, Fig. 3 is a bottom plan view thereof, Fig. 4 is a view, in horizontal section, taken on the line IV—IV of Fig. 2, and, Fig. 5 is a fragmentary view, in horizontal section, taken on the line V—V of Fig. 2.

An electric wall heater designated generally by the number 11 in Fig. 1 of the drawings, comprises a sheet metal casing 12, one or more heating units 13 normally located within the casing and a cover member 14, shown more particularly in Fig. 1 of the drawings.

The cover member 14 may be of any suitable or desired construction but is usually made as a casting and may be either painted or enameled as may be desired to conform to the color or decoration of the wall or room in which it is located. The cover 14 is provided with a plurality of openings 15 therein, to permit radiation therethrough of the heat generated in the heating unit or units 13. A projecting grid 16 is provided to cover each opening 15 and may be of any desired construction and may be held in proper operative position in front of the opening 15 in any suitable manner. A protecting grid 16 is provided to cover the opening or openings 15 and may be of any desired construction and may be held in proper operative position in front of the opening or openings 15 in any suitable manner.

The casing 12 is relatively shallow, substantially rectangular in contour, and of such size as to receive either a single heating unit 13 or a pair of such heating units located in side-by-side relation. The exact details of construction of the metal casing constitutes no part of my invention and the casing is preferably built up of sheet metal and embodies a back wall, top, bottom, and side walls, which latter are provided with integral and laterally extending flanges 17 by means of which the casing may be secured against a wall as by screws (not shown) extending through openings 18. In order to reduce the amount of heat conducted from the casing 12 to the adjacent surface of the wall, the flanges 17 have bumped portions 19 which directly operatively engage the front surface of the wall to space the casing therefrom a small distance. Knock-out portions 21 are provided in the bottom and in the side walls of the casing 12, any one of which may be removed in the usual manner to permit supply circuit conductors entering the casing 12.

A plurality of spaced pairs of ledges 22 and 23 are provided and are secured respectively to the side walls and to the back wall of the casing. These ledges are constituted by relatively small angle bar members, the vertical web of which is secured to the respective walls, the horizontal portion being provided with a recess 24 therein, for a purpose to be hereinafter set forth in detail.

The heating unit 13 comprises a substantially rectangular plate 25 of refractory electric-insulating material embodying means for supporting a resistor member 26 at its front surface. The resistor supporting means may be of any desired type or construction but is here shown as a plurality of lugs 27 integral with the plate 25 and extending angularly outwardly and upwardly from the front surface of the plate. A plurality of alined sets of lugs 27 are provided to permit mounting a plurality of heating elements 26 on the plate 25, six resistor elements being used in this case.

The heating unit 13 comprises a bottom angle bar member 28, a top angle bar 29 and two vertically extending members 31 of channel-shape in lateral section. The end portions of the angle bar members 28 and 29, and more particularly the horizontal web thereof, are provided with an opening therethrough, end portions 32 of the intermediate part or web of the channel members 31 extending through these openings and being bent over against the outside surface of the angle bar members to hold the frame around the plate 25. The intermediate part of the member 31 has two tongue portions 33 struck out therefrom and bent inwardly of the channel member, the ends of the tongue portions operatively engaging the vertical edge of the plate 25 to yieldingly hold the refractory plate within the frame and to resiliently position it between the members 31.

The end portions of the vertical webs of the angular bar members 28 and 29 fit into the recesses 24 in the ledges 22 and 23. The entire weight of each heating unit is carried by the lower pair of ledges 22 and 23, while the upper ledges 22 and 23 serve to hold the upper part of each heating unit in proper operative position and to prevent horizontal movement thereof, more particularly in a direction from front to back of the heater.

The lower angle bar member 28 has welded thereto and depending therefrom a plate 34 of sheet metal against which is secured a control switch 35 of any desired type to permit of controlling the energization of the plurality of resistor members 26. One such control switch is provided for each of the heating units 13. Suitable conductors (not shown) are provided to connect the resistors 26 with the control switch 35, which latter is connected to terminal blocks 36 by a pair of conductors 37. The supply circuit conductors hereinbefore mentioned as extending into the case 12 through the knock-out portions 21 are connected to the terminal blocks 36.

The heating unit 13 may be completely assembled before it is placed in proper operative position within the casing 12 into which it is placed by initially being held above the spaced supporting ledges 22 and 23, a sufficient space being provided at the top of the case above the upper ledges to permit of doing this. The heating unit is then lowered into the position shown in Fig. 2 of the drawing with the vertically extending web portions fitting into the recesses 24.

The conductors 37 are then connected to the proper terminal member on the terminal blocks 36. The cover 14 may then be placed in proper operative position and held by ornamental screws 38, a plurality of such screws being provided. The cover member 14 is provided with openings through which the switches 35 extend to permit the actuation by the operator.

While I have illustrated and described a wall heater comprising 2 heating units, I do not desire to be limited thereto, as it is obvious that the case 12 may be made narrow enough to receive a single heating unit only in which case the ledges 23 will be omitted and the heating unit will be supported by pairs of ledges 22 which are secured to the side walls of the casing 12.

Various modifications may be made in the device embodying my invention without departing from the spirit and scope therof, and I desire that only such limitations shall be placed thereon as are imposed by the prior art or are set forth in the appended claims.

I claim as my invention:

1. In an electric air heater, the combination with a sheet metal casing, of substantially pan-shape, and a plurality of recessed ledges secured to the walls thereof, of a heating unit comprising sheet metal frame members having lateral extensions fitting into said recessed ledges to support the heating unit in said casing.

2. In an electric air heater, the combination with a sheet metal casing, of substantially pan-shape, and a plurality of ledges having recesses therein secured to the walls thereof, of a quickly-removable heating unit comprising interlocking metal frame members, end portions of certain of said metal members fitting into the recesses in said ledges to hold the heating unit in proper operative position in the casing.

3. In an electric air heater, the combination with a casing, of an electric heating unit comprising a refractory resistor-supporting plate, angle bars at the top and bottom of the plate, and channel members at the vertical sides of the plate, said channel members having end portions projecting through the angle members and bent over thereagainst, said angle bars and channel members constituting a frame for said plate.

4. In an electric air heater, the combination with a casing, of an electric heating unit therein comprising a resistor-supporting plate of refractory material, angle bars at the top and the bottom of the plate, channel members at the vertical sides of the plate interfitting with said angle bars, and resilient tongues integral with the channel members for engaging the vertical sides of the plate to position the same between the channel members.

5. In an electric air heater, the combination with a casing, of an electric heating unit embodying a resistor-supporting plate of refractory material, and a frame therearound comprising interfitting angle bar and channel members operatively engaging the top, bottom and sides thereof, the channel members having punched-out tongue portions for yieldingly holding the plate between the channel members.

6. In an electric air heater, the combination with a casing, of an electric heating unit embodying a rectangular resistor-supporting plate of refractory material, and a frame therearound comprising angle members at the top and bottom edges of the plate, channel members at the vertical sides of the plate, end portions of the channel members extending through the angle bars and being bent over thereagainst, and a switch-supporting plate secured to and depending from the lower angle bar member.

7. In an electric air heater, the combination with a sheet metal casing, of substantially pan-shape, and a plurality of pairs of vertically-spaced ledges having recesses therein secured to the walls of said casing, of an electric heating unit embodying a rectangular resistor-supporting plate of refractory material, and a frame around the plate comprising top and bottom angle bar members and vertical-side members of channel section having portions extending through the angle bar members and bent over thereagainst, end portions of the angle bar members fitting into the recesses in the ledges to maintain the heating unit in proper operative position in the casing.

8. In an electric air heater, the combination with a sheet metal casing of substantially pan shape, and a plurality of pairs of vertically-spaced ledges having recesses therein secured to the walls of said casing, of an electric heating unit embodying a rectangular resistor-supporting plate of refractory material, and a frame around the plate comprising top and bottom angle bar members and vertical side members of channel section having portions extending through the angle bar members and bent over thereagainst, end portions of the lower angle bar interfitting with and resting on the lower pair of ledges to support the weight of the heating unit and end portions of the upper angle bar interfitting with the upper pair of ledges to prevent horizontal movement of the upper portion of the heating unit.

In testimony whereof, I have hereunto subscribed my name this 27th day of June, 1927.

FRANK F. FORSHEE.